June 2, 1942. D. G. MERRILL 2,284,832
GLASSWARE LEHR
Filed Feb. 12, 1941 7 Sheets-Sheet 1

Witness:
A. A. Horn.

Inventor:
Donald G. Merrill
by Brown & Parham
Attorneys.

June 2, 1942.  D. G. MERRILL  2,284,832
GLASSWARE LEHR
Filed Feb. 12, 1941  7 Sheets-Sheet 2
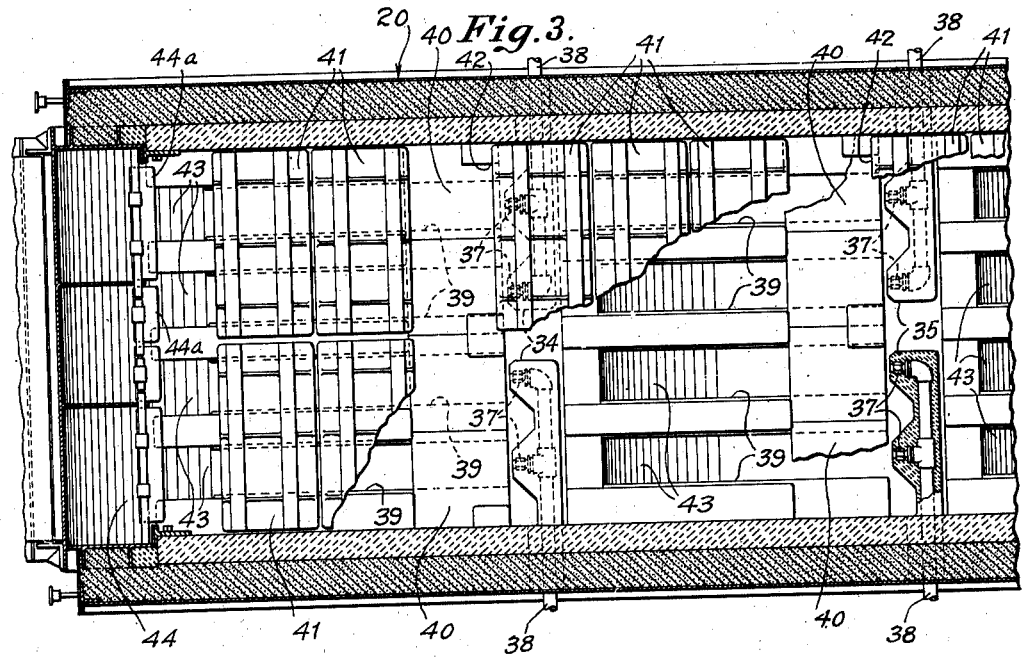
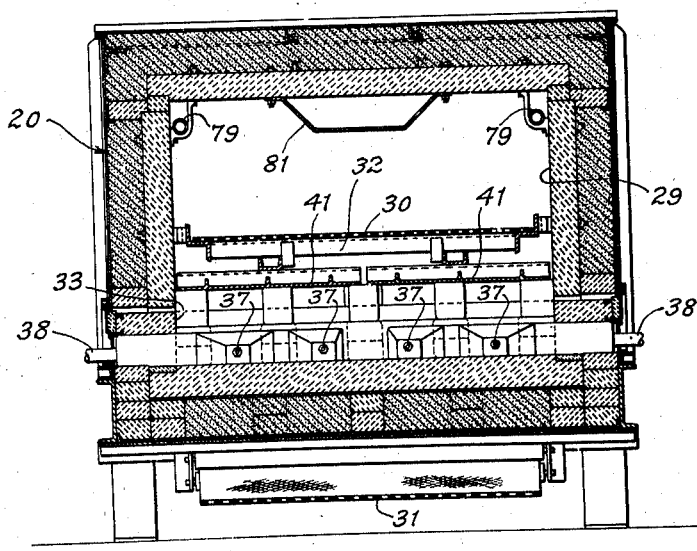
Witness:
U. A. Horn
Inventor:
Donald G. Merrill
by Brown & Parham
Attorneys.

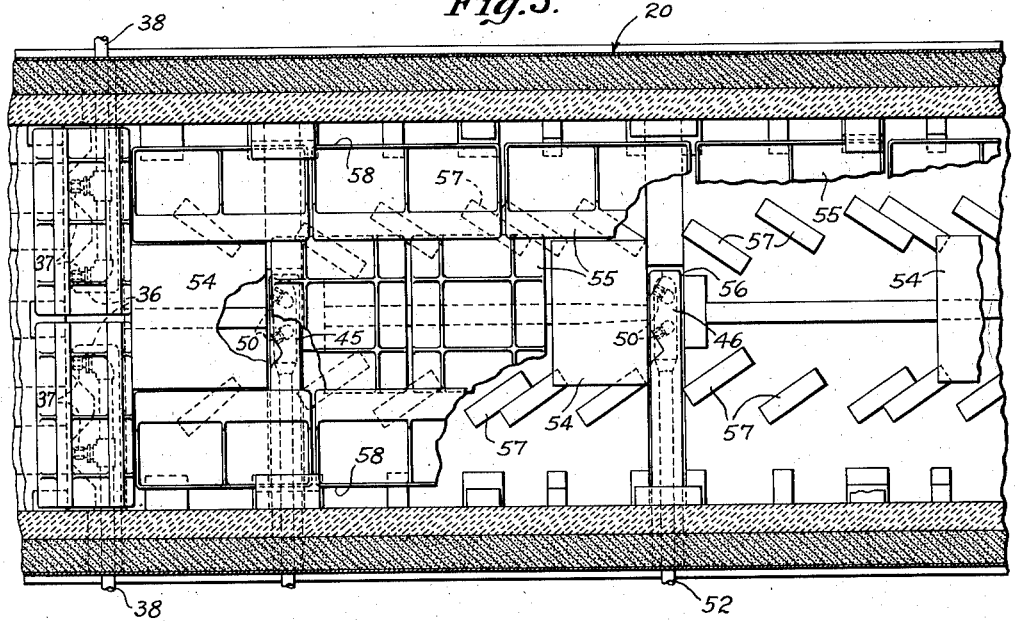
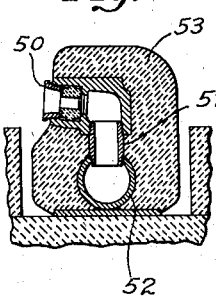
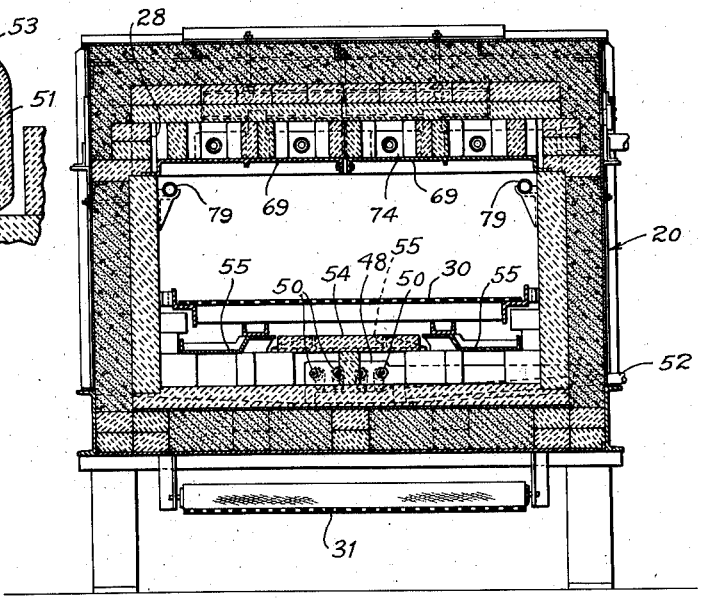

June 2, 1942.  D. G. MERRILL  2,284,832

GLASSWARE LEHR

Filed Feb. 12, 1941  7 Sheets-Sheet 4

Witness:
A. A. Horn

Inventor:
Donald G. Merrill
by Brown & Parham
Attorneys.

June 2, 1942.   D. G. MERRILL   2,284,832
GLASSWARE LEHR
Filed Feb. 12, 1941   7 Sheets-Sheet 5

Witness:
A. A. Horn

Inventor:
Donald G. Merrill
by Brown & Parham
Attorneys.

June 2, 1942.   D. G. MERRILL   2,284,832
GLASSWARE LEHR
Filed Feb. 12, 1941   7 Sheets-Sheet 6

Witness:
A. A. Horn

Inventor:
Donald G. Merrill
by Bunn & Carlson
Attorneys.

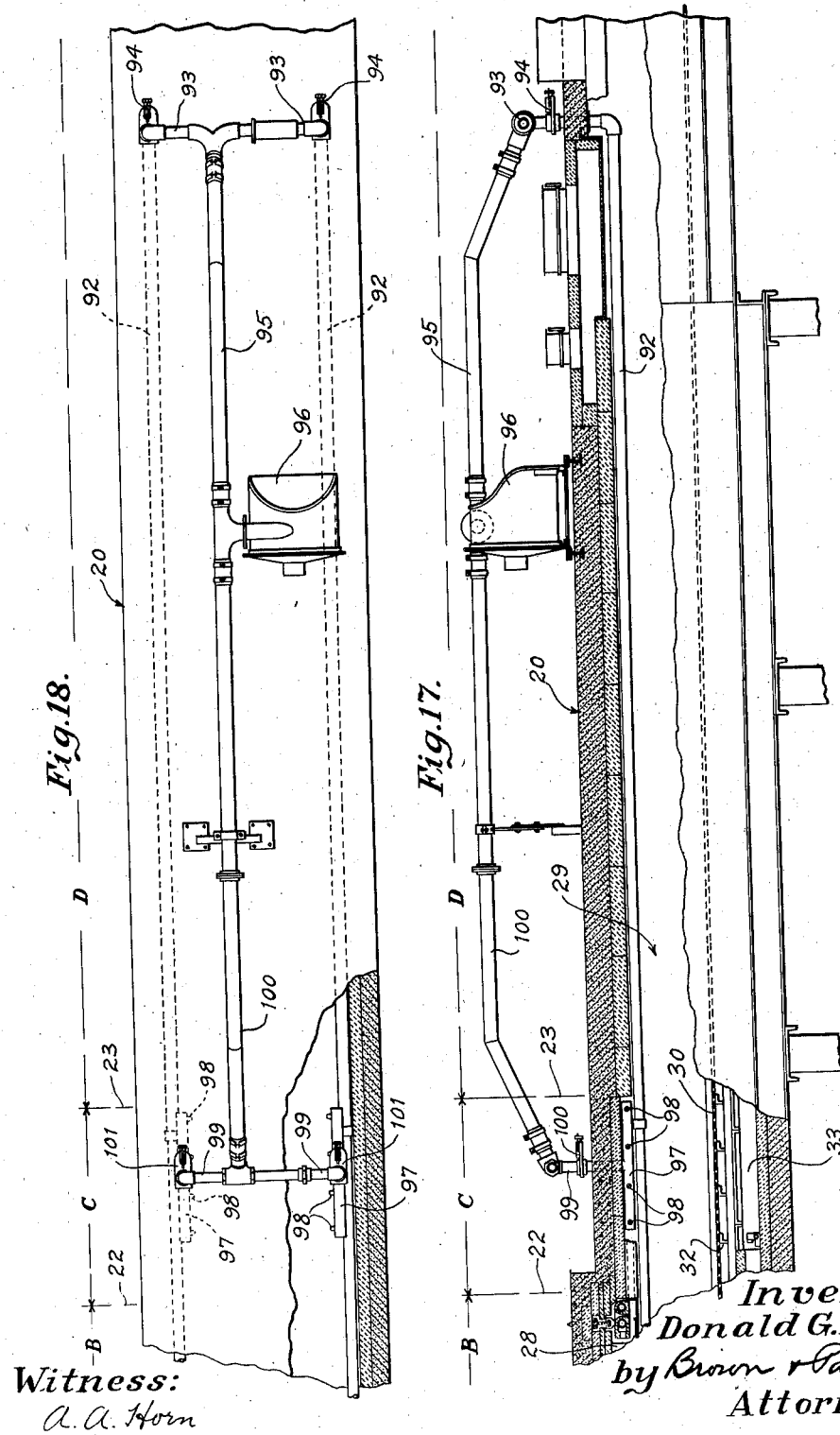

Patented June 2, 1942

2,284,832

UNITED STATES PATENT OFFICE 2,284,832

GLASSWARE LEHR

Donald G. Merrill, West Hartford, Conn., assignor to Hartford-Empire Company, Hartford, Conn., a corporation of Delaware Application February 12, 1941, Serial No. 378,498

17 Claims. (Cl. 49—47)

The present invention relates to a lehr for annealing or re-annealing glassware and more particularly to a lehr through which decorated ware may be passed for the fusing thereonto of a ceramic type decoration at a relatively high temperature and for subsequent re-annealing of the ware. The present invention provides improvements on the lehr of my copending application, Serial No. 206,344, filed May 6, 1938, of which the present application therefore may be said to be a continuation in part and which has become Patent 2,244,113.

As in the case of the invention of my aforesaid prior application, Serial No. 206,344, the present invention provides a glassware lehr comprising a plurality of zones including a preheating zone, a high temperature zone for the fusing of the decoration on the article of glassware, a rapid cooling zone, and a subsequent re-annealing zone which in turn may be subdivided into a slow cooling zone and a zone wherein the cooling is accelerated. The present invention provides novel means for heating the lehr tunnel and for causing circulations and recirculations of gaseous media therein so as to effect a gradual transition from predominately lateral recirculations in the lehr at the high temperature zone thereof to predominately longitudinal recirculation of gaseous media at the ware-entering end of the lehr tunnel.

A further object of the present invention is to provide effective means in this transition zone, as it may be called, for controlling, at least initially, the angular direction of the flames from the burners in this zone. Such means may include diagonally disposed baffle means for directing portions of the gases being circulated toward the lateral side walls of the lehr. The arrangement provides for desirable distribution of heat to the side walls of the tunnel so as to oppose the normal heat losses through the side walls and so as to maintain a substantially uniform temperature entirely across the tunnel at any cross section thereof. This makes for uniformity of treatment of all articles of glassware on any transverse section of the conveyor belt in the lehr tunnel.

A further object of the invention is to provide particular and novel means in the high temperature zone of the lehr tunnel to control the amount of gases drawn from the tunnel into an upper combustion chamber which is provided in that portion of the lehr. Such control means may include a damper, accessible from outside the lehr tunnel during the operation of the lehr, for controlling the amount of tunnel atmosphere recirculated through the upper combustion chamber.

A further object of the invention in connection with this upper combustion chamber is to provide spaced apertures through the wall between this chamber and the tunnel proper so as to diffuse the gases passing from the chamber into the tunnel and thereby to prevent the establishment of a hot spot at a place immediately under an outlet for gases from the upper combustion chamber into the tunnel or at any other particular place adjacent to the upper combustion chamber.

A further object of the present invention is to provide independence of control between the air supplied to the interior of the tunnel in the rapid cooling zone following the high temperature or fusing zone in respect to air similarly supplied to the preheating zone. The present invention may provide separately controllable pipes for supplying air to these zones of the tunnel or separate pipes may be connected to receive air from a common source subject to two controls, one of the total amount of air from the common source and the other of the proportion of such total air distributed to the different zones of the tunnel.

Other objects and advantages of the present invention will become apparent from the following particular description of a lehr embodying the invention, as shown in the accompanying drawings, in which:

Figures 1 and 2 together illustrate in somewhat diagrammatic form a longitudinal central vertical section of the entire lehr tunnel, omitting most of the ware packing table at the exit end of the tunnel and the structure associated with such table, including a portion of the endless lehr conveyor belt and its driving mechanism;

Fig. 3 is a horizontal section with parts broken away, showing the construction of the heating means adjacent to the forward or ware entering end of the lehr;

Fig. 4 is a transverse vertical section of the lehr taken on the line 4—4 of Fig. 1;

Fig. 5 is a view in horizontal section similar to Fig. 3 but taken at a point further down the lehr in the transition zone between the longitudinal recirculation zone and the zone in which the circulations are predominately lateral;

Fig. 5A is a fragmentary detailed view illustrating the construction of one of the burner nozzles shown in Fig. 5 and elsewhere;

Fig. 6 is a transverse vertical section of the lehr taken on the line 6—6 of Fig. 1;

Fig. 17 is a fragmentary longitudinal vertical section showing a portion of the lehr tunnel and a second form of mechanism for supplying air to the rapid cooling zone and the preheating zone of the tunnel, and Fig. 18 is a plan view of the structure shown in Fig. 17.

Figure 1:
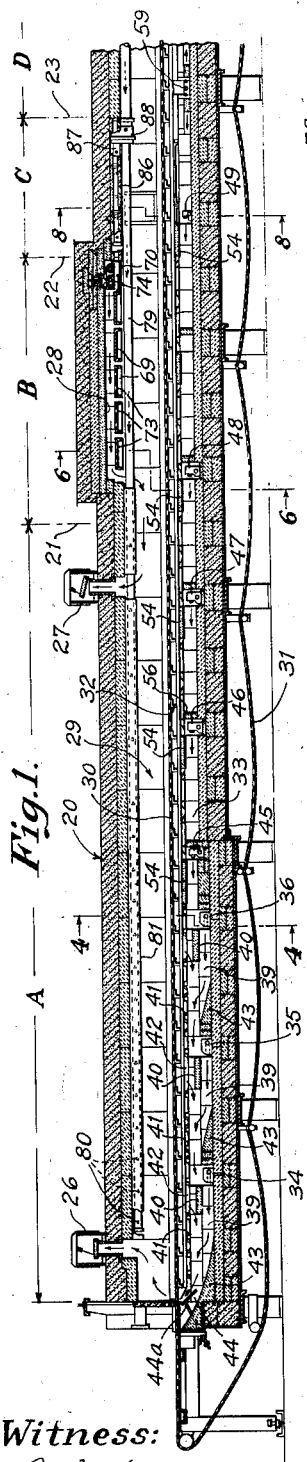
Figure 2:
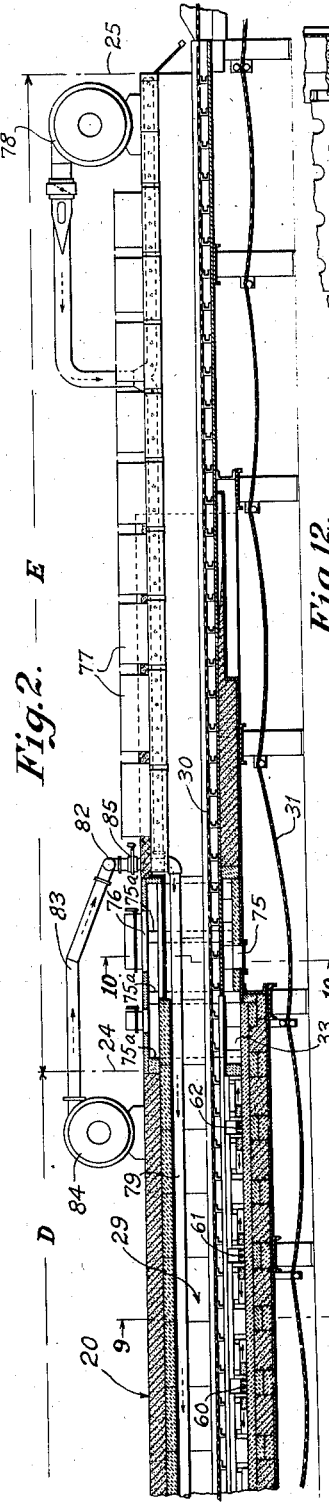

A lehr embodying the present invention comprises an elongate tunnel structure substantially as shown in Figs. 1 and 2, considered together, and as indicated generally at 20 in these views. Except as to particular features of novelty in connection with the present invention which will hereinafter be described in detail, the structure of the walls of the lehr tunnel need not be described herein other than to state that the manner of constructing these walls, the materials employed in their construction, and the manner of and means for supporting them may be substantially as disclosed in my aforesaid prior application, Serial No. 206,344.

The lehr tunnel and heating, cooling and gaseous media circulating provisions associated therewith, hereinafter to be more particularly described, are such that the lehr comprises or provides a longitudinal series of zones, substantially as follows. A preliminary heating zone A extends from the ware entering or forward end of the lehr tunnel to a vertical transverse plane at about the line indicated at 21 in Fig. 1. A high temperature zone for fusing or maturing ceramic decoration on the glassware passing through the lehr tunnel extends longitudinally of the lehr from the vertical line 21 to approximately the plane indicated by the line 22 in Fig. 1, this zone being designated B. A rapid cooling zone C extends from the line 22 for a short distance along the lehr tunnel, as to the line indicated at 23 in Fig. 1. A re-annealing and relatively slow cooling zone D extends longitudinally of the lehr from the line 23, Fig. 1, to approximately the plane indicated by the line 24, Fig. 2. A zone of more rapid or accelerated cooling, designated E, may extend from the line 24 for the remainder of the length of the lehr tunnel, as to the line indicated at 25 in Fig. 2.

The lehr tunnel is provided with a dampered stack 26 at its top near the forward end of the lehr tunnel, in the zone A, as shown in Fig. 1. A second dampered stack, indicated at 27 in Fig. 1 may be provided at the top of the lehr tunnel near the rearward end of the zone A. The lehr tunnel may be provided with a top fire box 28 in the high temperature zone B, as shown in Fig. 1 and partially in Figs. 11 and 12.

The lehr tunnel comprises a longitudinally extending main chamber or passageway 29, Figs. 1 and 2, through which the ware is transported while it is undergoing treatment. The upper reach 30 of an endless flexible openwork conveyor belt 31 extends through the chamber 29 of the lehr tunnel, being supported on an openwork frame structure 32, and provides a means for supporting the glassware to be treated in the lehr tunnel and for transporting such glassware through the lehr tunnel.

This conveyor belt, the means for and manner of supporting it, and the means for driving it do not, per se, form part of the present invention and therefore need not be described in detail. These parts may be substantially the same as those of the disclosure of my aforesaid prior application, Serial No. 206,344.

The tunnel structure is formed to provide beneath the main chamber or passageway 29 a sub-space or sub-chamber 33 extending from the forward or ware-entering end of the lehr tunnel for a substantial part of the length of the tunnel, as through the zones A, B, C and D, Figs. 1 and 2. Various heating provisions and means for controlling the direction of products of combustion and circulating gaseous media in the lehr tunnel are provided in this sub-chamber and function to provide desirable uniformity of temperature throughout any given transverse plane in the lehr tunnel and a desirable temperature gradient or curve longitudinally of this portion of the lehr tunnel. The heating and air circulating and directing provisions in the sub-chamber of the tunnel will now be more particularly pointed out.

The portion of the sub-chamber 33 extending from the forward or ware-entering end of the tunnel for part of the length of the zone A, as approximately half of this length, may be used for the reception of a plurality of longitudinally spaced batteries or banks 34, 35 and 36, respectively, of transversely spaced forwardly directed burner nozzles 37, some of which are shown in Figs. 3 and 4. These burner nozzles are provided with suitable fuel mixture, as by supply pipes 38, Figs. 3 and 4. Flames from these nozzles are directed forwardly in passages 39, best seen in Fig. 3. These passages are covered adjacent to and in advance of the burner nozzles by transversely extending refractory baffles 40, Figs. 1 and 3, which serve to shield the metallic cover structure 41 of this portion of the sub-chamber from the direct action of flames from the burner and also to baffle and diffuse gases entering the sub-chamber in advance of the batteries of burners through ports 42 in the metallic cover structure 41. As best seen in Fig. 1, these ports may be provided directly above the transversely extending refractory baffles 40. The flames and products of combustion from the burners passing along the passages 39 beneath the baffles 40 will serve to induce flow of gaseous media from the tunnel chamber 29 through the ports 42 and forwardly in the portion of the sub-chamber 33 in which the batteries of burner nozzles 37 are located, substantially as shown by the arrows in this portion of Fig. 1.

In advance of each battery of burner nozzles 37 and forwardly of the transverse refractory baffles 40 are longitudinally spaced upwardly and forwardly inclined refractory bottom baffles 43. (See Figs. 1 and 3.) The foremost of these bottom baffles 43 functions to direct the commingled re-circulating gaseous media from the tunnel chamber 29 and the products of combustion from the burners 37 upwardly through front outlets 44, controlled by dampers 44a, Figs. 1 and 3, into the extreme forward portion of the tunnel chamber 29, whence such gaseous media may pass upwardly through the conveyor belt and around the ware on such belt to the stack 26.

The provisions thus described will serve to produce longitudinal circulations of gaseous media in the front portion of the zone A, such circulations being aided by air discharging provisions in the upper part of a lehr tunnel which hereinafter will be further pointed out.

It may be desirable to provide for gradually more lateral or transverse circulatory movements of gaseous media in a further portion of the lehr tunnel. To this end, the portion of the sub-chamber 33 following that which contains the batteries of forwardly directed burners, above described, may be used to house longitudinally spaced assemblies 45, 46, 47, 48 and 49 (Fig. 1) of burners. These individually are located to discharge products of combustion diagonally to the direction of length of the tunnel at angles to such direction of length which are predetermined and selected when the burners are installed. Each of these burner assemblies 45 to 49, inclusive, may comprise two or more burner nozzles 50, each mounted for horizontal swinging adjustment about the axis of a short vertical pipe connection or nipple 51 by which the burner nozzle is operatively connected with a fuel supply pipe 52. (See Fig. 5A.) At the time of installing the burner assemblies 45 to 49, inclusive, each burner nozzle 50 is adjusted laterally about the axis of its pivotal connection with its supply pipe until it is directed at the desired angle to one of the side walls of the lehr tunnel. The nozzles 50 of each such assembly of burners are then encased in a plastic body of heat insulating and resistant material 53 which will harden and retain the burner nozzles in their pre-set positions.

The burner nozzles 50 discharge products of combustion diagonally toward the side walls of the tunnel beneath horizontally disposed baffles 54, Figs. 1, 5 and 6. These baffles 54 supplement metallic members 55, best seen in Figs. 5 and 6, which form the cover structure of the portion of the sub-chamber 33 in which the longitudinally spaced burner assemblies 45 to 49, inclusive, are disposed. Ports are provided at intervals adjacent to the baffle assemblies, as at 56, Figs. 1 and 5, for the indraft of gaseous media from the tunnel to this portion of the sub-chamber of the tunnel.

Refractory baffle blocks 57 are placed within this portion of the sub-chamber 33 of the tunnel in predetermined relations to the burner nozzles 50 to direct the products of combustion from these burner nozzles and entrained gaseous media from the tunnel diagonally toward the side walls of the tunnel at the angles desired. At the side walls of the tunnel, the products of combustion and entrained gaseous media from the tunnel may pass upwardly through the side spaces 58 to the tunnel chamber 29, thus providing diagonal circulatory movements of gases in this portion of the tunnel.

The heating provisions described so far may extend through the zones A and B. It of course is to be understood that the showing of particular members of batteries of forwardly directed burners in the front portion of the sub-chamber of the lehr tunnel and of assemblies of diagonally directed burners in the next portion of this tunnel sub-chamber are only by way of example and that different numbers of such batteries and assemblies of burners and different spacings between adjacent batteries and assemblies of burners may be employed.

Figure 7:
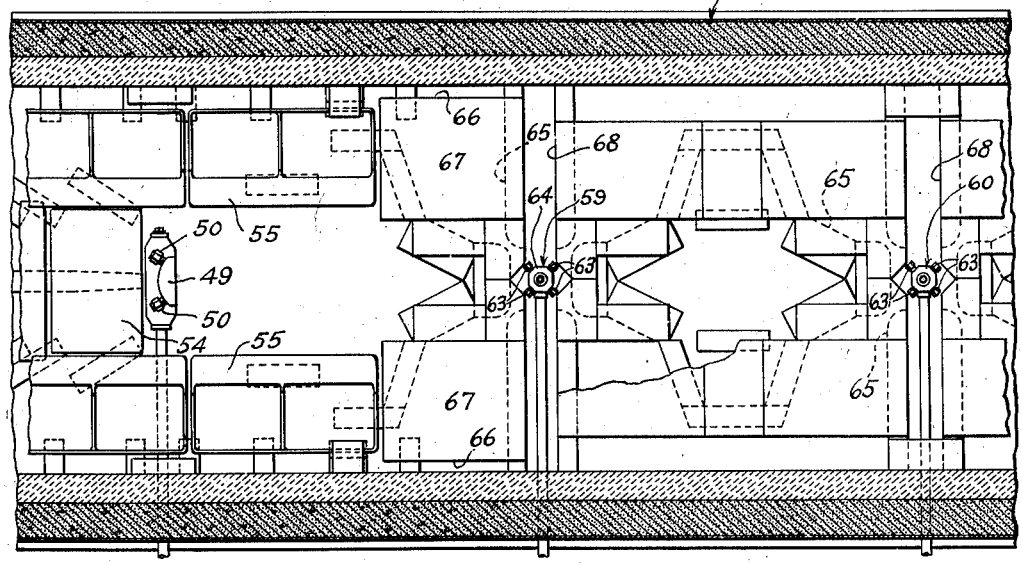
Fig. 7 is a view similar to Figs. 3 and 5 taken in horizontal section illustrating a portion of the tunnel wherein the circulations are predominately lateral.

In the next portion of the sub-chamber 33 of the lehr tunnel which, in the example shown, extends through the zones C and D, the burner assemblies may be such that the circulations of gaseous media in this portion of the tunnel will be predominately lateral or transverse of the tunnel. Thus, burner assemblies may be provided in this portion of the tunnel as indicated at 59, 60, 61 and 62, respectively, in the final portion of Fig. 1 and a portion of Fig. 2. As shown best in Fig. 7, each of these burner assemblies may comprise four burner nozzles 63 spaced angularly around the vertical axis of the burner assembly head 64 so that two of such burners discharge in a slightly forward direction although mainly toward the side walls of the tunnel while the other two burner nozzles discharge in a slightly rearward direction but also mainly toward the side walls of the tunnel. Each of these nozzles 63 discharges flames and products of combustion through a passage 65, which may be of Venturi shape. This passage leads to a side port or opening 66 through which products of combustion and gaseous media may move upwardly next to a side wall of the tunnel into the overlying main chamber 29.

The sub-chamber in which the burner assemblies 59 to 62 inclusive are located may be covered by suitable refractory slabs or members, which together make up a cover structure designated 67. This cover structure is open transversely of the sub-chamber at the places at which the burner assemblies 59 to 62 inclusive are located, as indicated at 68, Fig. 7, so that gaseous media from the tunnel may be drawn downwardly around the burner nozzles by the inductive action of such nozzles and re-circulated in a direction that is mainly lateral or transverse of the tunnel by the moving products of combustion from the burner nozzles.

Figure 12:
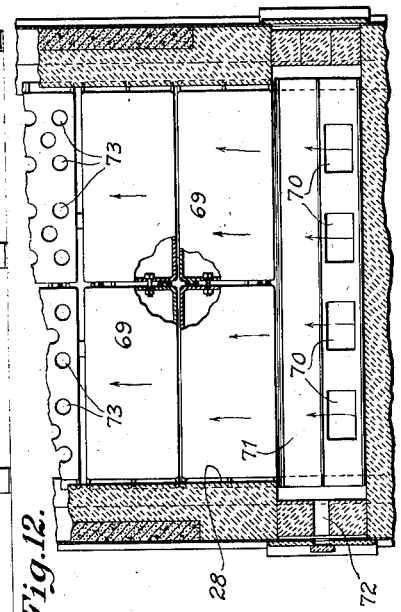
Fig. 12 is a view showing a portion of the upper fire box construction taken in horizontal section substantially on the line 12—12 of Fig. 11.
Figure 11:
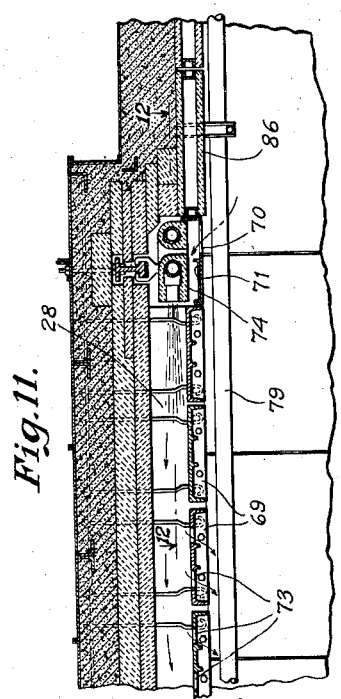
Fig. 11 is a fragmentary detail view principally in longitudinally vertical section, illustrating a portion of the upper fire box, the burners therefor and the means for controlling inflow of tunnel atmosphere thereto adjacent to the burner.

The top fire box 28, in the zone B, may be provided with a bottom structure made of metallic panel members, as indicated at 69, Figs. 1, 11 and 12. At the rearward end of his bottom structure, the metallic panel member included therein may be provided with a plurality of transversely spaced openings 70, constituting the intake port to the top combustion chamber from the tunnel chamber 29. A slidable control member, in the form of a plate 71, may be moved on this apertured panel member containing the openings 70 so as to cover these openings more or less and thereby to regulate the intake of gaseous media from the tunnel 29 to the top fire box. As shown in Fig. 12, an opening 72 is provided in a side wall of the lehr tunnel through which a suitable implement, not shown, may be projected and manipulated to slide the plate 71 rearwardly (toward the bottom of Fig. 12) from its fully opened position to cover the intake openings 70 to the extent desired. The opening 72 in the side wall of the lehr tunnel may be closed when not used for this purpose.

The metallic bottom structure 69 of the top fire box may be provided with a series of exhaust apertures 73 in its forward portion, Figs. 1, 11 and 12, so that products of combustion and circulating gaseous media will be directed into the tunnel at a number of spaced points and thus diffused in the tunnel atmosphere so as to avoid a hot spot at any one particular point, as at the extreme forward end of the combustion chamber.

The heating of the top fire box may be effected by a battery of transversely spaced forwardly directed burners, one of which is indicated at 74 in Figs. 1 and 11. This battery of burners may be located in the rearward portion of the top combustion chamber above the intake openings 70.

The cooling provisions of the lehr will now be more particularly described. At a forward portion of the zone E, the lehr tunnel may be provided with a controlled air intake port 75 in its bottom and a regulably controlled air intake port 76 directly overhead. These ports may be kept closed or opened as desired. These ports may be connected by side cooling ducts or wall passages 75a, Figs. 1 and 10.

The remaining or cooling portion of the lehr tunnel may be provided with top cooling provisions indicated generally at 77, Fig. 2, including the air blowing mechanism 78. These specific provisions and their functions are the same as in the lehr of my aforesaid application, Serial No. 206,344, and hence need not be described herein.

In the lehr of the present invention, separately controllable means are provided for supplying air to the upper corner portions of the lehr tunnel in the rapid cooling zone C and in the preheating zone A.

In one form of mechanism, a pair of air pipes 79 enter the top of the lehr tunnel at the corner portions thereof at places which may be in the cooling zone E (see Fig. 2). These pipes extend forwardly in the upper corner portions of the tunnel through the zones D, C, B and in the zone A nearly to the stack 26, being supported by suitable brackets or hangers which may be of any suitable construction. The pipes 79 are closed at their forward ends and are provided with lateral orifices 80 in the portions thereof in the preheating zone A for discharging jets of air inwardly or toward the longitudinal median line of the tunnel.

A baffle 81, which may be substantially trapezoidal in cross-section, as shown in Fig. 4, may be provided at the top of the lehr tunnel in the preheating zone between the pipes 79 for directing the jets of air from the latter downwardly at the central portion of the tunnel, thus aiding in effecting transverse circulatory movements of the gaseous media in the tunnel and in diffusing the preheated air from the pipes 79 throughout the gaseous products previously in this portion of the tunnel.

Figure 10:
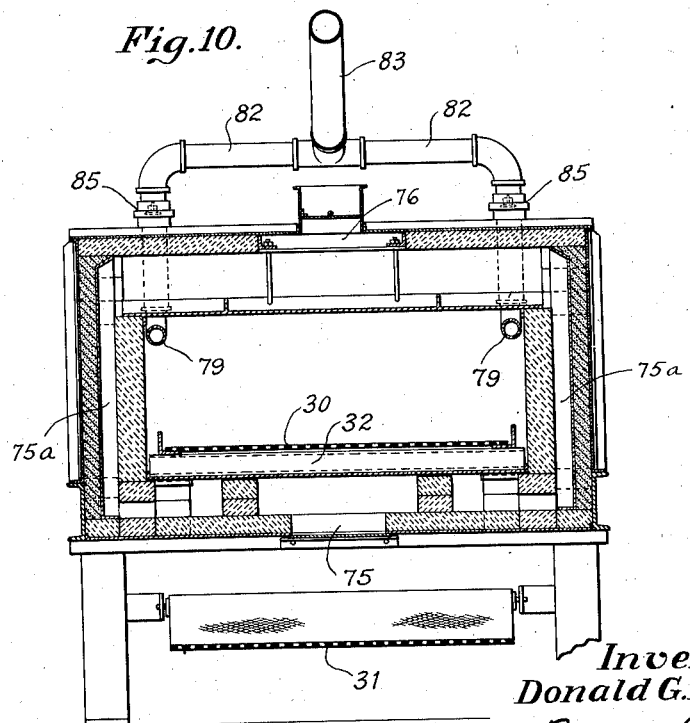
Fig. 10 is a view in transverse vertical section on the line 10—10 of Fig. 2.

The pipes 79 receive cooling air from branch pipes 82, Fig. 10, of a pipe 83 which is connected with the discharge side of an air blower 84 (Fig. 2). Each of the branch pipes 82 is provided with a damper or valve 85 (Figs. 2 and 10), so that the volume of air passing to each of the pipes 79 may be independently regulated.

Figure 8:
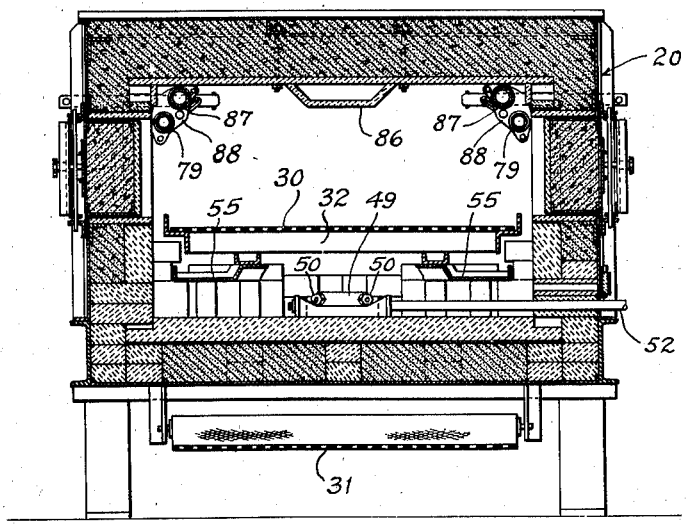
Fig. 8 is a view of the lehr in vertical section on the line 8—8 of Fig. 1.
Figure 9:
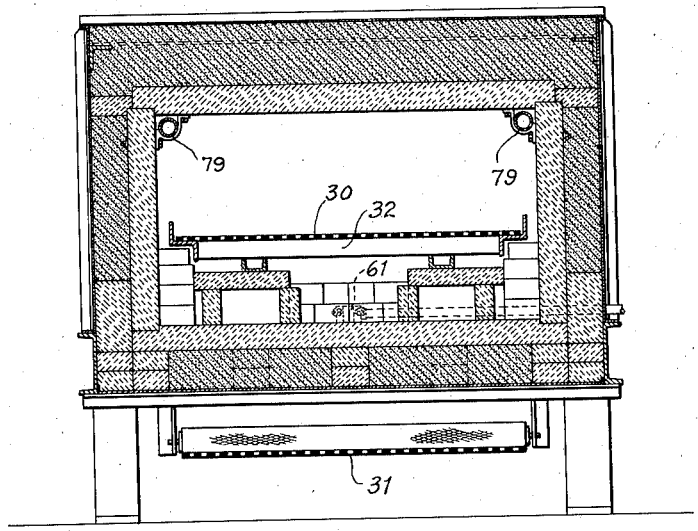
Fig. 9 is a view in transverse vertical section on the line 9—9 of Fig. 2.
Figure 13:
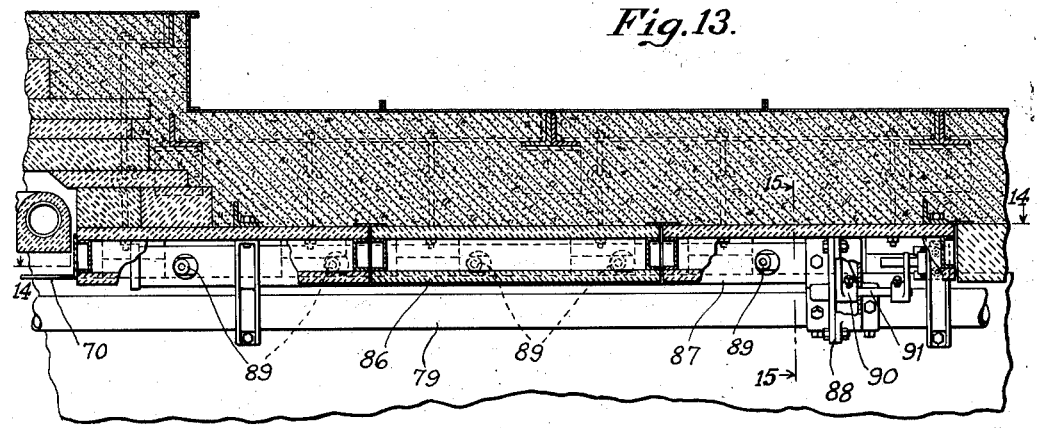
Fig. 13 is a fragmentary detail view taken in substantially longitudinal vertical section, illustrating a portion of the rapid cooling zone and the rear end portion of the upper fire box.
Figure 14:
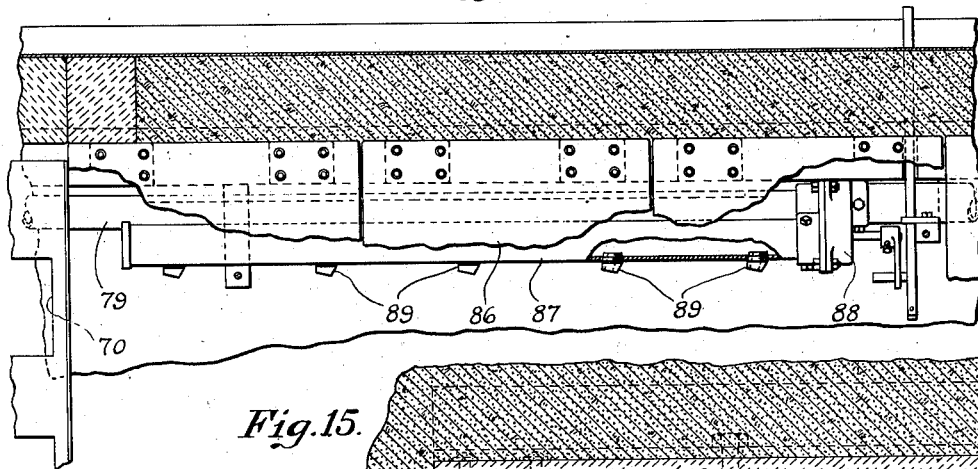
Fig. 14 is a fragmentary detail view in horizontal section taken substantially on the line 14—14 of Fig. 13.
Figure 15:
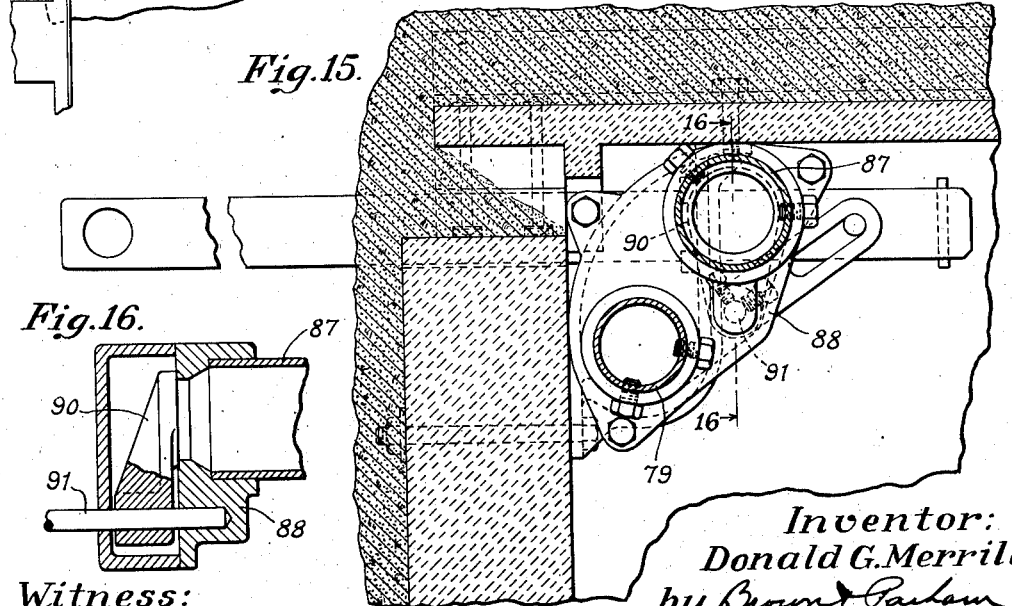
Fig. 15 is a fragmentary detail view on an enlarged scale and in transverse vertical section taken substantially on the line 15—15 of Fig. 13.
Figure 16:
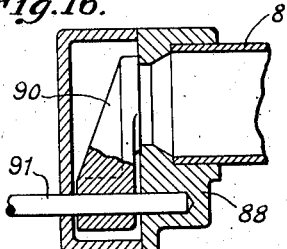
Fig. 16 is a fragmentary detail view taken substantially in longitudinal vertical section, illustrating the interior construction of the proportioning valve shown in Figs. 13 to 15.

A top baffle 86 is provided between the pipes at the upper part of the tunnel in the rapid cooling zone C, as shown in Figs. 1 and 8. Also, in this rapid cooling zone are provided short pipes 87, respectively located in the upper corner portions of the lehr tunnel. Each of the pipes 87 is connected at its rearward end by a proportioning valve 88 with the adjacent pipe 79. Each pipe 87 is closed at its forward end and is provided with lateral jet openings or nozzles, best seen at 89 in Fig. 13, for projecting jets of air inwardly and forwardly toward the baffle 86 in the rapid cooling zone C. As shown in Figs. 15 and 16, the proportioning valve 88 includes a pivoted valve member or gate 90 which may be swung angularly about the axis of its pivotal support 91 to a position to completely cover the bore of the pipe 87, as shown in Figs. 15 and 16, or to a position to completely cover the bore of the pipe 79 or to any intermediate position. The function of this proportioning valve is to distribute between the two pipes the total amount of air permitted to pass into the pipe 79 from the branch supply pipe 82, this in turn being controlled by the setting of the valve 85 in the branch pipe 82.

In the form of structure shown in Figs. 17 and 18, air pipes 92 enter the top of the tunnel and extend forwardly in the upward corner portions thereof similarly to the pipes 79. These pipes 92 receive air from branch pipes 93, provided with valves 94 and connected by pipe 95 with the exhaust side of a blower fan 96. The portions of the pipes 92 in the preheating zone (not shown) are, of course, provided with the lateral discharge orifices or jet openings, similar to those of the pipes 79. Short pipes 97 are provided in the rapid cooling zone C, these being provided with lateral discharge orifices or nozzles 98 similarly to the pipes 87. The pipes 97 have independent connections through the top of the tunnel, by means of branch pipes 99, with a supply pipe 100 which is connected with the outlet side of the blower fan. Valves 101 are provided in the branches 99. With this form of construction, the control of the air supplied through the short pipes in the rapid cooling zone is entirely independent of the control of the air supplied through the pipes 92. The volumes of air supplied through these respective pipes thus may be independently regulated. The air supplied through the air pipes 97 may be cooler than that obtained by the previous form of mechanism in that air is supplied directly to the short pipes in the rapid cooling zone without undergoing preheating as in the first form of mechanism.

The air jets from these pipes may have a cooling function in the rapid cooling zone as well as aiding in effecting desirable circulatory movements of the tunnel atmosphere. In the preheating zone, the air jets may serve primarily to aid circulation of the gaseous media therein but may have some heating effect.

The invention is not to be limited to the specific details herein described as various modifications and changes may be made by those skilled in the art.

I claim:

1. A lehr for decorating glassware, comprising an initial or heating up zone in which glass is raised from substantially room temperature to a temperature such as to fuse the decoration thereon, heating means in the forward portion of said zone adjacent to the end of the lehr through which the ware enters constructed and arranged to establish and maintain substantially longitudinal recirculations of heating gases in the lehr tunnel, other heating means arranged adjacent to the rear portion of said zone constructed and arranged to maintain predominantly lateral recirculations in the lehr tunnel in paths moving upwardly adjacent to the side walls of the tunnel and downwardly adjacent to the longitudinal median portion thereof, and intermediate heating means disposed along said zone of the lehr tunnel between the first and second named heating means and constructed and arranged to establish and maintain circulatory currents of heating gases in the lehr tunnel in a gradual progression from the longitudinal recirculation toward the front end of the tunnel to predominant lateral recirculations toward the second named heating means.

2. Apparatus in accordance with claim 1, wherein said intermediate heating means comprises a plurality of longitudinally spaced groups of burners directed at predetermined angles in respect to the longitudinal center line of the tunnel and located below the path of the ware therethrough.

3. Apparatus in accordance with claim 1, wherein said intermediate heating means comprises a plurality of longitudinally spaced groups of burners located below the path of the ware through the tunnel, each burner group comprising a plurality of nozzles and symmetrically disposed across the tunnel and wherein each of said nozzles is directed and arranged for independent initial or set-up adjustment of the angle thereof in respect to the longitudinal axis of the lehr tunnel.

4. Apparatus in accordance with claim 1, wherein said intermediate heating means comprises a plurality of longitudinally spaced burners in said tunnel below the path of the ware therethrough which are constructed and arranged to direct flames in paths, each having a substantial component longitudinally of the tunnel, and two longitudinally disposed sets of spaced inclined baffles for deflecting portions of the gases traveling longitudinally of the tunnel beneath the ware path toward the side walls of the tunnel.

5. A lehr for decorating and reannealing glassware, comprising an elongate tunnel, means for moving the glassware therethrough, a zone in said lehr in which decorating material is fused on the ware including a top heating means, said heating means comprising a combustion chamber in the top of said tunnel, panel members substantially separating said combustion chamber from the interior of said tunnel but providing a transversely extending opening between said tunnel and the interior of said combustion chamber at a portion of the latter spaced from the end of the lehr through which the ware enters, and also providing an exit opening between said combustion chamber and the interior of said tunnel adjacent to the end of said combustion chamber adjacent to the first named opening and constructed and arranged to direct products of combustion in said combustion chamber in a direction toward the forward end of the lehr through which the ware enters, said panel members having apertures therein to permit more of the products of combustion to flow from said combustion chamber into the tunnel so as to diffuse the heating effect of said combustion chamber and to prevent the establishment of a hot spot in said tunnel adjacent to said exit opening.

6. A lehr for decorating and reannealing glassware, comprising an elongate tunnel, means for moving the glassware therethrough, a zone in said lehr in which decorating material is fused on the ware including a top heating means, said heating means comprising a combustion chamber in the top of said tunnel, panel members substantially separating said combustion chamber from the interior of said tunnel but providing a transversely extending opening between said tunnel and the interior of said combustion chamber at a portion of the latter spaced from the end of the lehr through which the ware enters, and also providing an exit opening between said combustion chamber and the interior of said tunnel adjacent to the end of said combustion chamber toward said end of the lehr, burner means in said combustion chamber adjacent to the first named opening and constructed and arranged to direct products of combustion in said combustion chamber in a direction toward the forward end of the lehr through which the ware enters, and means for adjustably controlling the amount of gases drawn from said tunnel into said combustion chamber through the first named opening by the inductive effect of the burner means in said combustion chamber.

7. A lehr in accordance with claim 6, wherein the last named means comprises a damper movable longitudinally of the lehr, an opening through the lateral side of the lehr tunnel through which said burner means may be ignited and for inspection of the combustion in said combustion chamber, this opening also providing access to said damper and for the adjustment thereof from outside the lehr.

8. A decorating lehr comprising an elongate tunnel, means for moving glassware therethrough, said tunnel comprising a plurality of zones including a preheating zone, a zone for fusing the decoration in the glassware, a rapid cooling zone and reannealing zone, means for supplying heat to the tunnel in each of said zones, a pipe passing along said tunnel from a point in the reannealing zone to the forward portion of the preheating zone and having openings therethrough in said preheating zone, a pipe in said rapid cooling zone extending longitudinally thereof having openings through which air may be supplied into said tunnel, means to supply air to said pipes, and means for independently controlling the amount of air supplied to each of said pipes.

9. A lehr in accordance with claim 8, wherein the means for supplying air to said pipes comprises a common means supplying air to both said pipes, means for controlling the amount of air so supplied, and an adjustable proportioning valve for predetermining the proportion of the air supplied as aforesaid which will pass to each of said pipes and thence through the apertures therethrough into the tunnel.

10. In a lehr, an elongate tunnel having a longitudinally extending main chamber or passageway through which glassware to be treated may be transported and having a sub-chamber extending beneath this main chamber from the forward end of the lehr for part of the length thereof, forwardly directed burners in said sub-chamber in a portion of the latter adjacent to the front of the lehr, horizontal baffles in advance of and above the level of the burners and adjacent thereto, and upwardly and forwardly inclined baffles at a lower level in advance of said first named baffles and substantially in line with said burners.

11. In a lehr, an elongate tunnel through which ware may be transported for treatment therein, said tunnel having a sub-chamber beneath the path along which the ware may be moved, forwardly directed burners in a portion of the sub-chamber nearest to the ware-receiving end of the lehr, burners in a more rearward portion of the sub-chamber for directing products of combustion toward the side walls of the lehr tunnel in directions more lateral than forwardly in the tunnel, and other burners located in the sub-chamber intermediate said first named and said second named burners for directing products of combustion diagonally toward the side walls of the tunnel at predetermined angles intermediate the forward directions of the first named burners and the more nearly lateral directions of the second named burners.

12. In a lehr, an elongate tunnel through which ware may be transported for treatment therein, said tunnel having a sub-chamber beneath the path along which the ware may be moved, forwardly directed burners in a portion of the sub-chamber nearest to the ware-receiving end of the lehr, burners in a more rearward portion of the sub-chamber for directing products of combustion toward the side walls of the lehr tunnel in directions more nearly lateral than forwardly in the tunnel, other burners located in the sub-chamber intermediate said first named and said second named burners for directing products of combustion diagonally toward the side walls of the tunnel at predetermined angles intermediate the forward directions of the first named burners and the more nearly lateral directions of the second named burners, and baffles located in said sub-chamber in association with said last named burners for aiding in controlling the direction of movement of products of combustion from said last named burners toward the side walls of the lehr tunnel.

13. In a lehr, an elongate tunnel having successive preheating, high temperature, and rapid cooling zones, air conducting means extending in the tunnel past said rapid cooling zone, said high temperature zone and into said preheating zone, said air conducting means being adapted to introduce air into the tunnel in said preheating zone, and other air conducting means in said rapid cooling zone of the tunnel for introducing air into that portion of the tunnel.

14. In a lehr, an elongate tunnel having successive preheating, high temperature, and rapid cooling zones, air conducting means extending in the tunnel past said rapid cooling zone, said high temperature zone and into said preheating zone said air conducting means being adapted to introduce air into the tunnel in said preheating zone, other air conducting means in said rapid cooling zone of the tunnel for introducing air into that portion of the tunnel, and means for independently controlling the volumes of air supplied to the respective air conducting means.

15. In a lehr, an elongate tunnel having successive preheating, high temperature and rapid cooling zones, a pair of air conducting pipes extending in the upper corner portions of said tunnel through said rapid cooling and high temperature zones and into said preheating zone, said pipes having lateral orifices in the preheating zone for discharging jets of air into the tunnel at said zone, other air conducting pipes located in the upper corner portions of the rapid cooling zone of the tunnel and provided with lateral orifices for discharging air into the tunnel at this zone, and means for regularly controlling the amounts of air supplied to said first named pipes and to said second named pipes, respectively.

16. A glassware lehr comprising an elongate tunnel, means for moving glassware through the tunnel, and means for establishing and maintaining a longitudinal circulation of gases within a portion of the tunnel adjacent to the forward or ware-entering end thereof, comprising a plurality of longitudinally spaced forwardly directed burners disposed in said portion of the tunnel adjacent to the floor thereof, a cover structure for said burner partly separating the interior of said portion of the tunnel into an upper passageway for the glassware and a sub-chamber thereunder containing said burners, said cover structure having openings therein above and adjacent to the respective burners through which gases may be drawn downwardly from said upper passageway into said sub-chamber by the inductive action of said burners and having a more forwardly located opening therein for discharging gases from said sub-chamber into said upper passageway, refractory baffles in said sub-chamber beneath said first named openings in said cover structure and above the level of said burners, and upwardly and forwardly inclined baffles located at a lower level in said sub-chamber in advance of said first named baffles and substantially in line with said burners.

17. Apparatus in accordance with claim 16, wherein each of said burners comprises a plurality of transversely spaced nozzles symmetrically arranged in respect to the longitudinal center line of the lehr tunnel.

DONALD G. MERRILL.